(12) United States Patent
Copeland

(10) Patent No.: US 8,106,834 B2
(45) Date of Patent: Jan. 31, 2012

(54) SWITCHABLE PATCH ANTENNA FOR RFID SHELF READER SYSTEM

(75) Inventor: Richard Loyd Copeland, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 226 days.

(21) Appl. No.: 12/463,743

(22) Filed: May 11, 2009

(65) Prior Publication Data

US 2010/0001921 A1    Jan. 7, 2010

Related U.S. Application Data

(60) Provisional application No. 61/134,167, filed on Jul. 7, 2008.

(51) Int. Cl.
*H01Q 1/38* (2006.01)
(52) U.S. Cl. .................. 343/700 MS; 343/702; 343/876
(58) Field of Classification Search .......... 343/700 MS, 343/702, 876
See application file for complete search history.

(56) References Cited

U.S. PATENT DOCUMENTS

| 5,241,321 | A   |   | 8/1993  | Tsao |
|-----------|-----|---|---------|------|
| 5,668,558 | A   | * | 9/1997  | Hong ............ 343/700 MS |
| 6,002,370 | A   |   | 12/1999 | McKinnon et al. |
| 6,771,223 | B1  | * | 8/2004  | Shoji et al. .......... 343/702 |
| 7,825,867 | B2  | * | 11/2010 | Tuttle ................ 343/758 |
| 2002/0014995 | A1 |  | 2/2002  | Roberts |
| 2005/0200528 | A1 |  | 9/2005  | Carrender et al. |

FOREIGN PATENT DOCUMENTS

EP    0590955 A2    4/1994

OTHER PUBLICATIONS

International Search Report and Written Opinion dated Mar. 1, 2010 for International Application No. PCT/US2009/002853, International Filing Date May 7, 2009 consisting of 11 pages.

* cited by examiner

*Primary Examiner* — Tan Ho
(74) *Attorney, Agent, or Firm* — Alan M. Weisberg; Christopher & Weisberg, P.A.

(57) ABSTRACT

A switchable patch antenna includes a ground plane, a metal patch, at least two feed lines and a switch. The metal patch is positioned adjacent, but not in contact with, the ground plane. Each feed line is electrically connected to the metal patch. Each feed line is substantially orthogonal to at least one other feed line. The switch is electrically connected to the at least two feed lines. The switch is operable to sequentially select between the at least two feed lines for exciting the switchable patch antenna.

20 Claims, 10 Drawing Sheets

Phi = 0°
z=2cm

Phi = 180°
z=2cm

Phi = 0°
z=5cm

Phi = 180°
z=5cm

Phi = 0°
z=30cm

Phi = 180°
z=30cm

Phi = 0°
z=2cm

Phi = 180°
z=2cm

Phi = 0°
z=30cm

Phi = 180°
z=30cm

SWITCHABLE PATCH ANTENNA FOR RFID SHELF READER SYSTEM

CROSS-REFERENCE TO RELATED APPLICATION

The present invention is related to and claims priority to U.S. Provisional Patent Application No. 61/134,167, filed Jul. 7, 2008, entitled SWITCHABLE PATCH ANTENNA FOR RFID SHELF READER SYSTEM, the entire contents of which is incorporated herein by reference.

STATEMENT REGARDING FEDERALLY SPONSORED RESEARCH OR DEVELOPMENT n/a

FIELD OF THE INVENTION

The present invention relates generally to antennas and more specifically to a switchable patch antenna for Radio Frequency Identification ("RFID") shelf readers.

BACKGROUND OF THE INVENTION

Radio Frequency Identification ("RFID") identifies and tracks products, animals, or people by transmitting and receiving radio frequency ("RF") waves. Devices called RFID labels or tags are applied to or incorporated into the tracked object. Most RFID tags contain at least an antenna for receiving and transmitting the signal and an integrated circuit for storing and processing information, modulating and demodulating the RF signal, and other specialized functions. An RFID reader is used to "read", i.e., wirelessly transfer, the information in these RFID tags for use with a variety of applications.

For example, RFID techniques may be used in all areas of an enterprise supply chain, e.g., manufacturers, distributors, wholesalers, and retailers, to automatically track and manage inventories. Because several individual RFID labels can reside in the receiving field of an RFID reader's antenna and be individually recognized, data may be transferred to and from each label individually or an entire electronic inventory may be obtained of the labels residing in the antenna field for a single RFID reader. One such application uses an RFID shelf reader to achieve this result. An RFID shelf reader typically includes an antenna or antenna array which is located in radiating proximity to, e.g., above or below, an inventory storage area, such as a shelf or cabinet. The RFID shelf reader can automatically detect and "read" each RFID label in the storage area.

In certain applications, RFID shelf reader antennas operate only in the near field or possibly in the radiating near field. An exemplary application is reading RFID labels affixed to DVDs. Additional description of such an exemplary use can be found in pending U.S. patent application Ser. No. 11/829,315, entitled, "RFID System with Integrated Switched Antenna Array and Multiplexer Electronics," the entirety of which is incorporated herein by reference. Even if the DVDs are stacked together, the RFID labels are only a short distance away from the reader antenna and each label is located in a known position, i.e., either the bottom of the inside DVD cover or perhaps on the inside spine region. In other applications, such as for apparel, the RFID labels may be placed so that they reside in the near field, radiating near field, and the far field regions.

For shelf reader applications, where items with RFID tags attached are stacked on top of a shelf region, the orientation and location of the RFID tags may be such that the orientation may be random and the tag locations may reside in regions comprising the near field, radiating near field, and far field regions.

Prior RFID shelf reader implementations have used either a linear polarized antenna or a circularly polarized antenna. If the RFID label orientation is controlled and consistently in one particular direction, the linear polarized antenna solution is generally used. An example of a known RFID shelf reader linearly polarized patch antenna 10 is shown in FIG. 1. The linearly polarized patch antenna 10 typically includes a metal patch 12 suspended over a ground plane 14. The patch antenna 10 may be constructed using a dielectric substrate 16 to separate the metal patch 12 from the ground plane 14. For example, the patch antenna 10 may be constructed in the form of a printed circuit board, where one side includes the metal patch 12 and the opposite side includes the ground plane 14. The metal patch 12 may be fed, or activated, using a microstrip transmission line 18 as a feed line. Conventional linear polarized antennas radiate in only one direction, creating a null field in the orthogonal direction. Thus only one orientation of the RFID labels is covered. If an RFID label is misplaced or the item is improperly shelved, it will not be detected with a linear polarized antenna.

If the RFID label orientation is not well controlled, a circularly polarized antenna is usually preferred. An example of a known RFID shelf reader circularly polarized patch antenna 20 is shown in FIG. 2. The circularly polarized patch antenna 20 includes a circular or elliptical shaped metal patch 22 suspended over a ground plane 24 by a standoff 26 through the center, which grounds the patch 22 to the ground plane 24 below. For the circularly polarized patch antenna 20 of FIG. 2, the metal patch 22 is separated from the ground plane 24 by an air gap; however, the patch antenna 20 may be constructed using a dielectric substrate to separate the metal patch 22 from the ground plane 24. The circular or elliptical patch 22 is directly fed off center by element 28. The circularly polarized patch antenna 20 is designed to produce equal orthogonal electric field components in the far field.

The metal patch 22 is fed, or activated, using a feedpoint 28. A tuning stub 30 may be used to capacitively tune the resonating frequency of the patch antenna 20. The tuning stub 30 is a metal cylinder whose vertical position in relation to the metal patch 22 is adjustable. FIG. 3 provides a side view of the circularly polarized patch antenna 20 illustrating the positioning of the tuning stub 30.

The radiating pattern of the circularly polarized antenna changes orientation with the phase of the excitation signal so all orientations of the RFID label may be detected. However, while the field orientation for the linear polarized antenna is very consistent from the near field to the far field distances away from the antenna, this is not the case for the simple circularly polarized antenna. Circularly polarized antennas have some regions of very weak fields especially in the near field or radiating near field. The near field and radiating near field exhibit null zones for certain angles of the RFID tag for the circularly polarized antenna and only in the far field is the behavior of the field omni-directional and free from null zones.

Additionally, other devices may also use a patch antenna to communicate with a large number of devices at one time. One such device is the Electronic Article Surveillance ("EAS") tag deactivation system described in U.S. patent application Ser. No. 12/331,604, entitled "Metal Oxide Semiconductor Device for Use in UHF EAS Systems," the entire teachings of which are hereby incorporated by reference. As with the RFID shelf reader described above, the antenna of the EAS deactivation system must be in relatively close proximity to EAS tags in order to transmit a signal capable of deactivating the EAS tags. When deactivating a large number of EAS tags simultaneously, it is important that the EAS tag orientation is known and controlled, or the radiating field must be uniform and omni-directional. Otherwise, not all intended EAS tags will be deactivated. As shown above, known antenna configurations are not reliable for this use.

In either case, the fields above the surface of these antennas have null zones or weak field zones at either the near field, the radiating near field, or the far field. These approaches only work in specific applications and circumstances.

Therefore, what is needed is a system that provides an antenna solution having a field that is well behaved in the near field, the radiating near field, and the far field in all possible label or tag orientations above the antenna.

SUMMARY OF THE INVENTION

The present invention advantageously provides a switchable patch antenna, RFID reader and method for creating an electric field that is well behaved in the near field, the radiating near field, and the far field in all possible label or tag orientations above the antenna. Generally, a linearly polarized patch antenna includes at least two orthogonal feed lines and an excitation signal is switched between the two feed lines in order to produce an electric field that has orthogonal orientations over time.

In accordance with one aspect of the present invention, a switchable patch antenna includes a ground plane, a metal patch, at least two feed lines and a switch. The metal patch is positioned adjacent, but not in contact with, the ground plane. Each feed line is electrically connected to the metal patch. Each feed line is substantially orthogonal to at least one other feed line. The switch is electrically connected to the at least two feed lines. The switch is operable to sequentially select between the at least two feed lines for exciting the switchable patch antenna.

In accordance with another aspect of the present invention, a radio frequency identification ("RFID") shelf reader includes a controller, a transceiver and a switchable patch antenna. The transceiver is electrically connected to the controller. The transceiver is operable to transmit and receive RF signals. The switchable patch antenna is electrically connected to the transceiver. The switchable patch antenna includes a ground plane, a metal patch, at least two feed lines and a switch. The metal patch is positioned adjacent, but not in contact with, the ground plane. Each feed line is electrically connected to the metal patch and is substantially orthogonal to at least one other feed line. The switch is electrically connected to the at least two feed lines. The switch is operable to sequentially select between the at least two feed lines for exciting the switchable patch antenna.

In accordance with yet another aspect of the present invention, a method is provided for creating an electric field. A switchable patch antenna is provided which includes a ground plane, a metal patch, at least two feed lines and a switch. The metal patch is positioned adjacent, but not in contact with, the ground plane. Each feed line is electrically connected to the metal patch and is substantially orthogonal to at least one other feed line. The switch is electrically connected to the at least two feed lines and is operable to select one of the at least two feed lines. One of the at least two feed lines is sequentially selected and an excitation signal is applied to the selected feed line.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
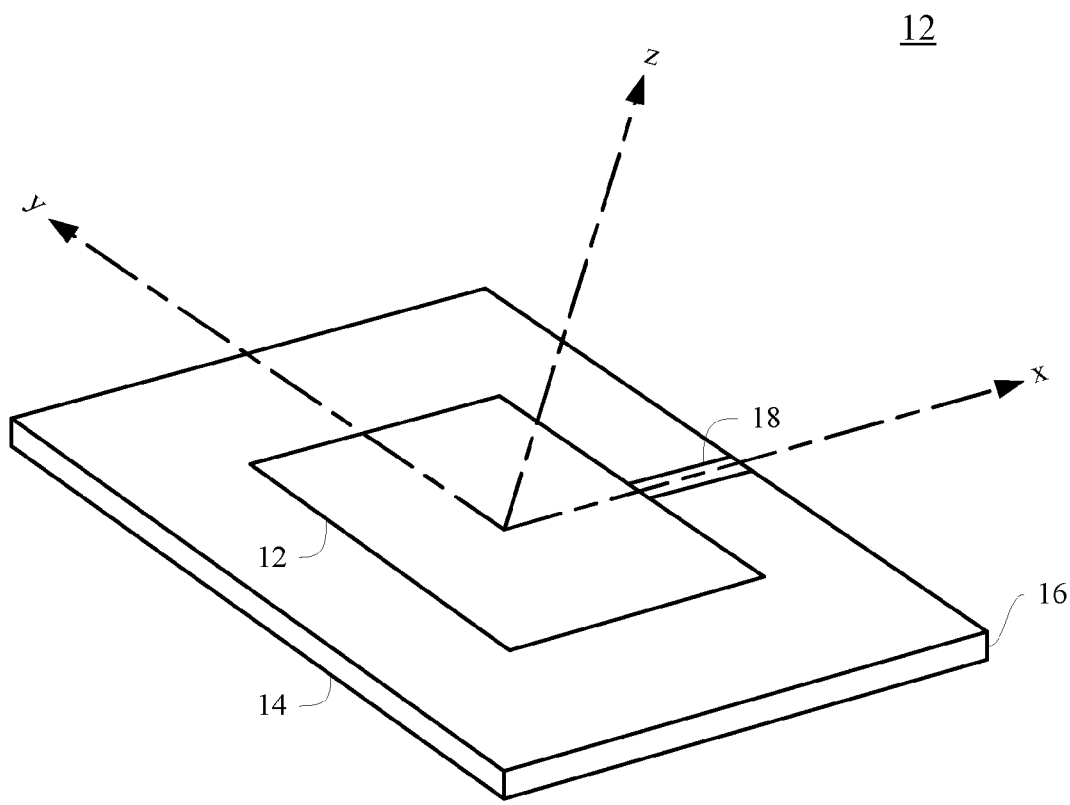
FIG. 1 is a perspective view of a prior art linearly polarized patch antenna.

Before describing in detail exemplary embodiments that are in accordance with the present invention, it is noted that the embodiments reside primarily in combinations of apparatus components and processing steps related to implementing a system and method for implementing a switchable patch antenna that has well-behaved a field in the near field, the radiating near field, and the far field in all orientations above the antenna. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a switchable patch antenna for use with a Radio Frequency Identification ("RFID") shelf reader or an Electronic Article Surveillance ("EAS") tag deactivation system. As further described herein, the invention may include a substantially square shaped patch antenna with two microstrip feed lines of substantially equal length. These two feed lines may be alternatively fed through a switching device to create two field modes, horizontal and vertical, so that during one time interval one orientation port is fed and in another time interval the other orthogonal port is fed. The computed vector E fields in three regions (near field, radiating near field, and far field) are well behaved in that the fields have strong orientations in each of the horizontal or vertical orientations for each of the two modes of operation. Such an antenna system provides an improved electric field distribution in the region directly above it for the near field, radiating near field, and far field and is shown to be better than conventional linear or circularly polarized antennas.

Figure 4:
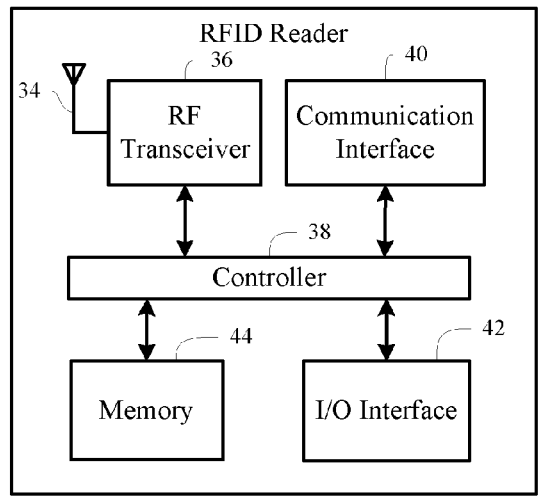
FIG. 4 is a block diagram of an exemplary Radio Frequency Identification ("RFID") shelf reader constructed in accordance with the principles of the resent invention.

Referring now to the drawing figures in which like reference designators refer to like elements, there is shown in FIG. 4, an exemplary RFID shelf reader constructed in accordance with the principles of the present invention, and designated generally as "32." RFID shelf reader 32 includes a switchable patch antenna 34 coupled to an RF transceiver 36 which transmits RF signals to and receives RF signals from an RFID tag (not shown) in a well-known manner. The switchable patch antenna 34 is discussed in greater detail below. The RF transceiver 36 is coupled to a controller 38 which generally controls the operation of RFID shelf reader 32.

The controller 38 is also coupled to a communication interface 40 and an input/output ("I/O") interface 42. The I/O interface 42 interacts with any of a number of peripheral input/output devices to present information to and collect information from a user. The communication interface 40 enables communication between the RFID reader 32 and a communication network (not shown). The controller 38 is also coupled to a memory 44 which contains instruction modules for controlling the operation of the RFID reader 32. The memory 44 may be volatile or non-volatile.

Figure 5:
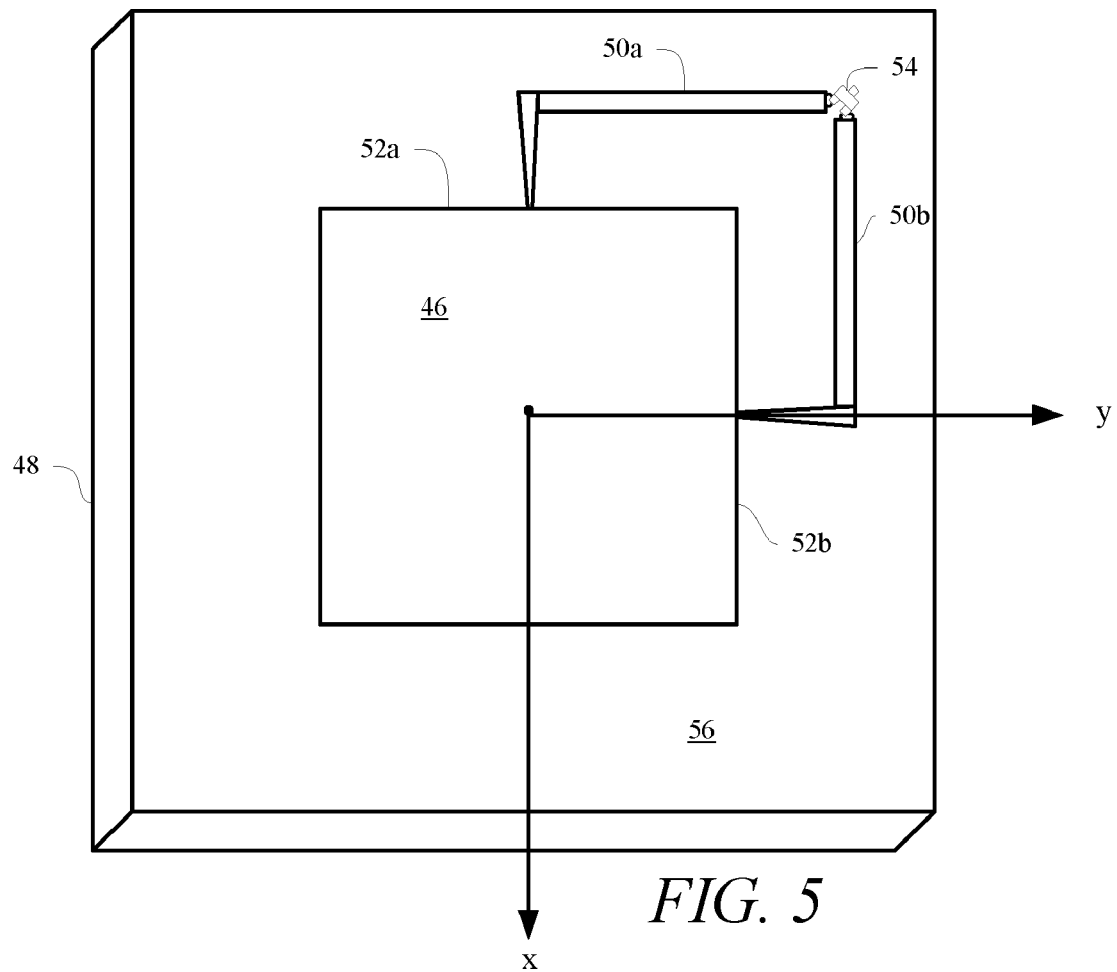
FIG. 5 is a top view of a switchable patch antenna constructed in accordance with the principles of the present invention.

Referring now to FIG. 5, one embodiment of the present invention is an orthogonally fed switchable patch antenna 34 having a square metal patch 46 positioned above, i.e., adjacent, but not in contact with, a ground plane 48. The metal patch material is typically copper but can be aluminum or any other similar metal of comparable conductivity. Exemplary thickness of the substrate material, which is the distance between the patch and the ground plane, is typically 3-6 mm and depends of the dielectric constant of the substrate material. Typical dielectric materials are FR4 or ceramic for example. However, the invention is not limited to such and it is contemplated that other dielectric materials can be used. The switchable patch antenna 34 is fed by two microstrip transmission lines 50a, 50b which tap off the midpoints of orthogonal edges 52a, 52b of the switching patch antenna 34. A switching device 54 is used to select either one feed line 50a or the other 50b sequentially so that the electric field is operating in a linear polarized mode in two orthogonal modes at separate time frames. The metal patch 46 is a square geometry and is located on top of a dielectric substrate 56 with a ground plane 48 underneath. For example, the dielectric substrate 56 may be a printed circuit board having the metal patch 46 on one side and a ground plane 48 on the opposite side. The excitation signal is applied through a switch 54 to either of the feed lines 50a, 50b, one at a time. The feed lines 50a, 50b should be substantially symmetrical and of substantially equal length, thereby ensuring that the feed lines exhibit identical impedance characteristics. Also, the patch 46 is preferably substantially square to ensure that the fields above the antenna 34 are of substantially equal magnitudes in both orthogonal modes.

Although the switch 54 is shown in FIG. 5 as a small outline transistor ("SOT") device, any suitable switching device may be used. An exemplary switch may be found in pending U.S. patent application Ser. No. 11/829,315, entitled, "RFID System with Integrated Switched Antenna Array and Multiplexer Electronics," the entirety of which is incorporated herein by reference. Another example of a suitable switch is the Skyworks AS195-306 PHEMT GaAs IC High Power SP5T 0.1-2 GHz switch. However, the present invention is not limited to these switches and it is contemplated that any similar type of high frequency switch can be used. It should be noted that RF power is generally not applied during switching. The timing of the switching is dependent upon the application for use. For example, an interrogation mode may activate the patch antenna 34 in each direction for only a few milliseconds each, and then sleep for several seconds or minutes. On the other hand, a deactivation mode may be very quick and only occur in response to a trigger, e.g., motion detected, manual activation, etc.

Figure 6:
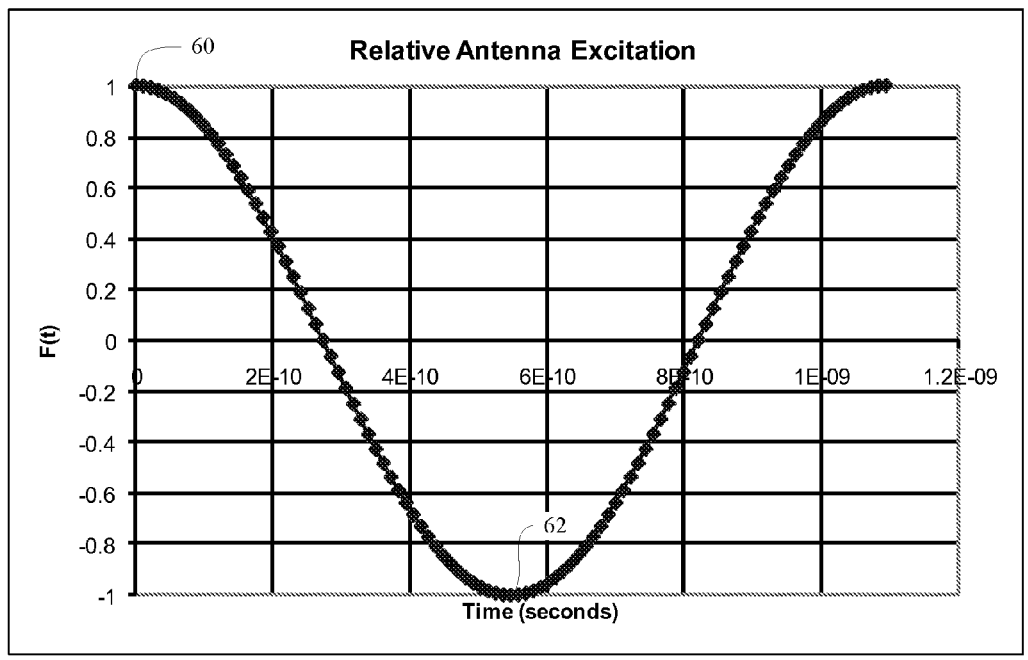
FIG. 6 is a graph showing a relative antenna excitation showing two modes of operation for the switchable patch antenna of FIG. 5 in accordance with the principles of the present invention.

Referring now to FIG. 6, a graph 58 is provided which illustrates a relative antenna excitation indicating two modes of operation of interest. These two modes refer to 0° phase 60 (Phi=0°) and 180° phase 62 (Phi=180°). It can be shown by computer simulation that these two modes represent important peak phases for the resultant fields above the antenna 34.

FIGS. 7-12 illustrate the vector electric field on a plane above the antenna at various distances of 2 cm, 5 cm and 30 cm, corresponding to the near field, the radiating near field, and the far field, respectively. The fields are only shown for the x-orientation source feed 50a energized. When the y-orientation source feed 50b is energized, the fields are mainly in the y-orientation, i.e., substantially orthogonal to those fields shown in FIGS. 7-12. In the vector electric field diagrams of FIGS. 7-12, the strength of the field correlates to the thickness of the vector arrows. In other words, a strong field is indicated by an arrow having a thick shaft and a large arrowhead, while a weak field is indicated by an arrow having a small head and a thin shaft.

It should be noted that with existing prior art simple linear polarized antennas, only an x or y orientation mode is possible. In accordance with the switchable antenna of the present invention, both x and y modes are advantageously present.

Figure 7:
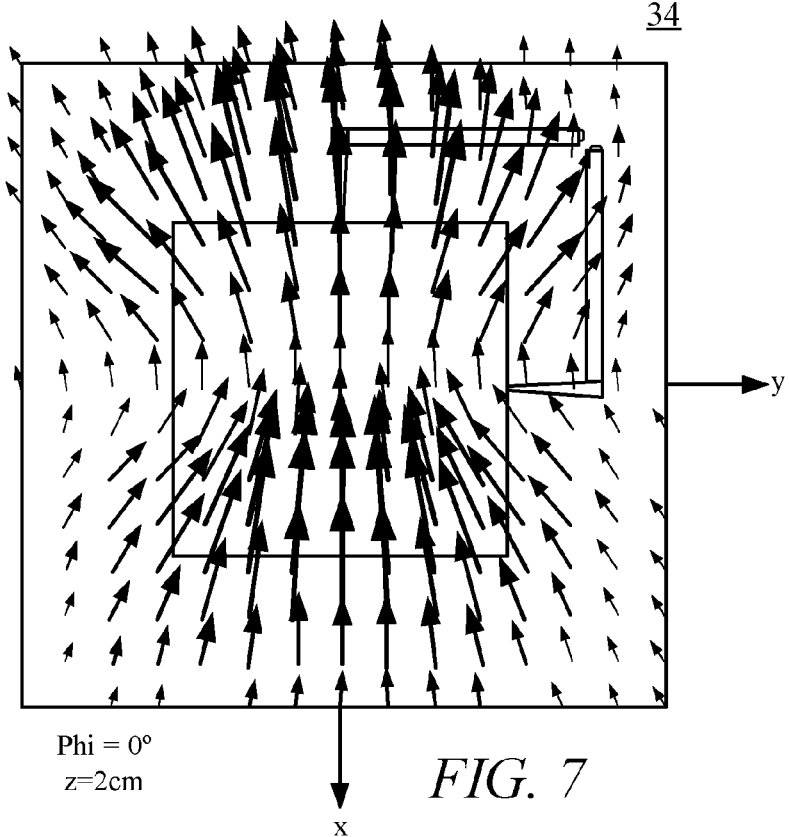
FIG. 7 is a vector diagram illustrating the 0° phase electric field pattern of a switchable patch antenna in the near field (2 cm above the metal patch) when the x-orientation source feed is energized in accordance with the principles of the present invention.
Figure 8:
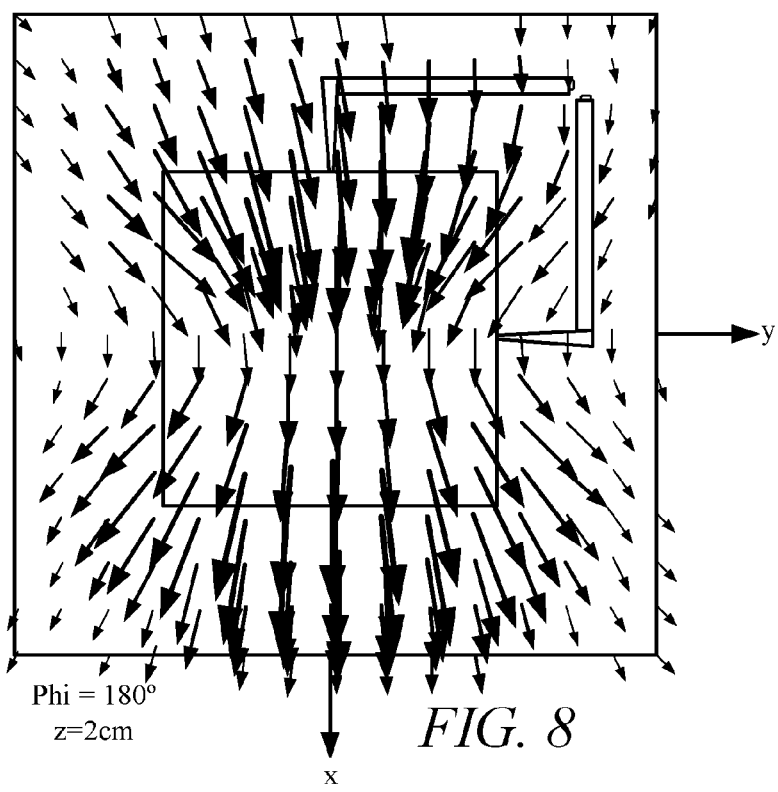
FIG. 8 is a vector diagram illustrating the 180° phase electric field pattern of a switchable patch antenna in the near field (2 cm above the metal patch) when the x-orientation source feed is energized in accordance with the principles of the present invention.

In FIG. 7, the vector field of the near field is shown in the 0° phase at a distance of 2 cm above the antenna plane 46. Note that the electric field is primarily in the x-direction, with the greatest field strength near the center of the metal patch 46 along the x-axis. FIG. 8 shows the vector field of the near field in the 180° phase at a distance of 2 cm above the antenna plane 46. Note that the vector field is almost identical to the vector field created in the 0° phase except that the field is oriented in the opposite direction, i.e., the polarity has changed.

Figure 9:
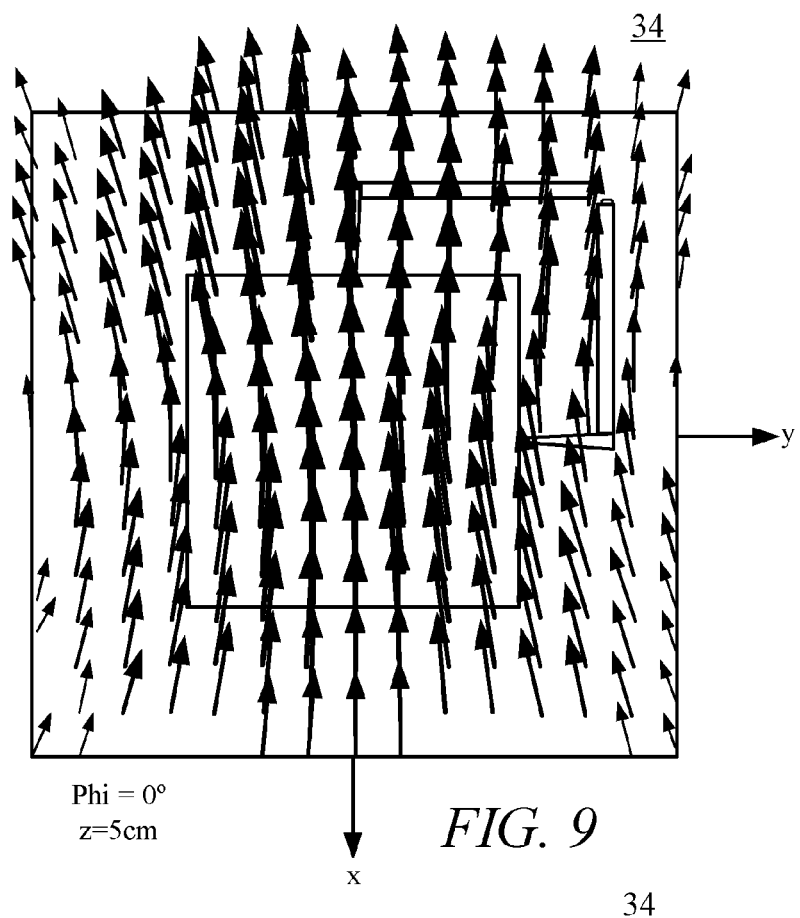
FIG. 9 is a vector diagram illustrating the 0° phase electric field pattern of a switchable patch antenna in the radiating near field (5 cm above the metal patch) when the x-orientation source feed is energized in accordance with the principles of the present invention.
Figure 10:
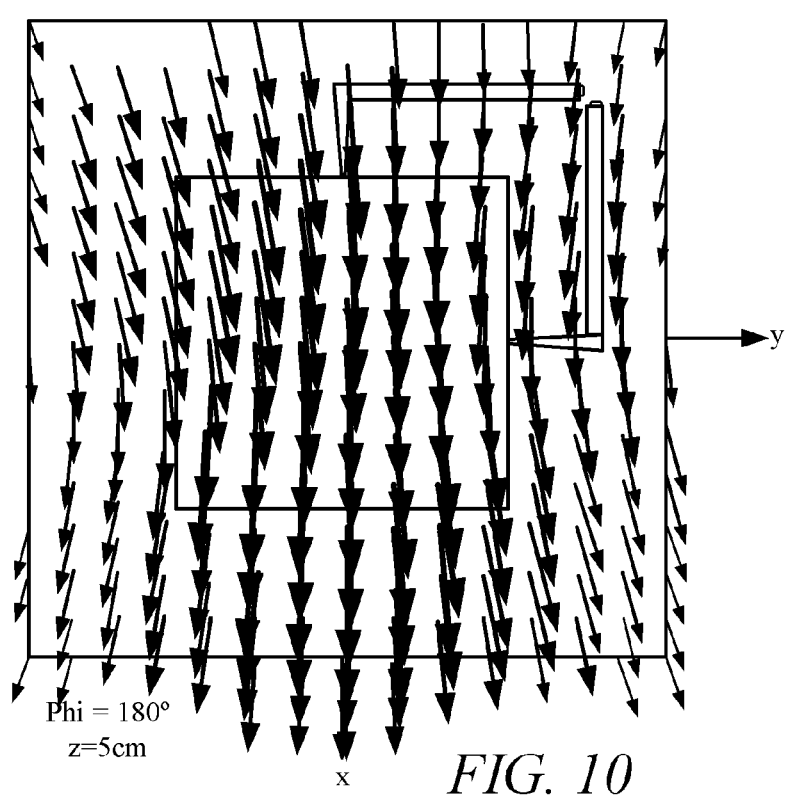
FIG. 10 is a vector diagram illustrating the 180° phase electric field pattern of a switchable patch antenna in the radiating near field (5 cm above the metal patch) when the x-orientation source feed is energized in accordance with the principles of the present invention.

In FIG. 9, the vector field of the radiating near field is shown in the 0° phase at a distance of 5 cm above the antenna plane 46. The field strength at 5 cm is greater than the field strength at 2 cm. FIG. 10 shows the vector field of the radiating near field in the 180° phase at a distance of 5 cm above the antenna plane 46. Again, the vector field is almost identical to the vector field created in the 0° phase except that the polarity has changed.

Figure 11:
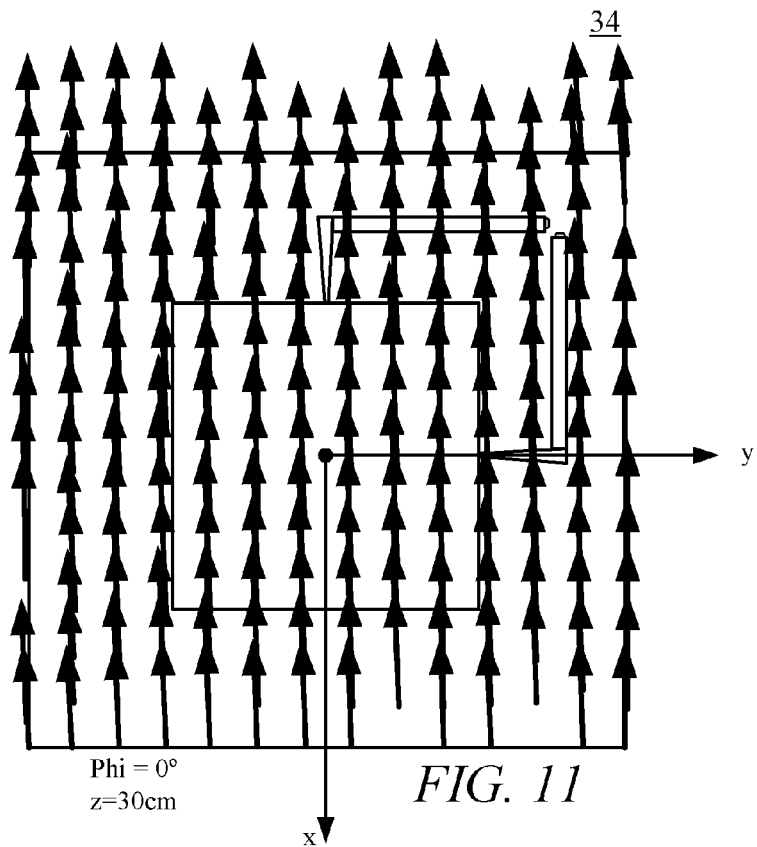
FIG. 11 is a vector diagram illustrating the 0° phase electric field pattern of a switchable patch antenna in the far field (30 cm above the metal patch) when the x-orientation source feed is energized in accordance with the principles of the present invention.
Figure 12:
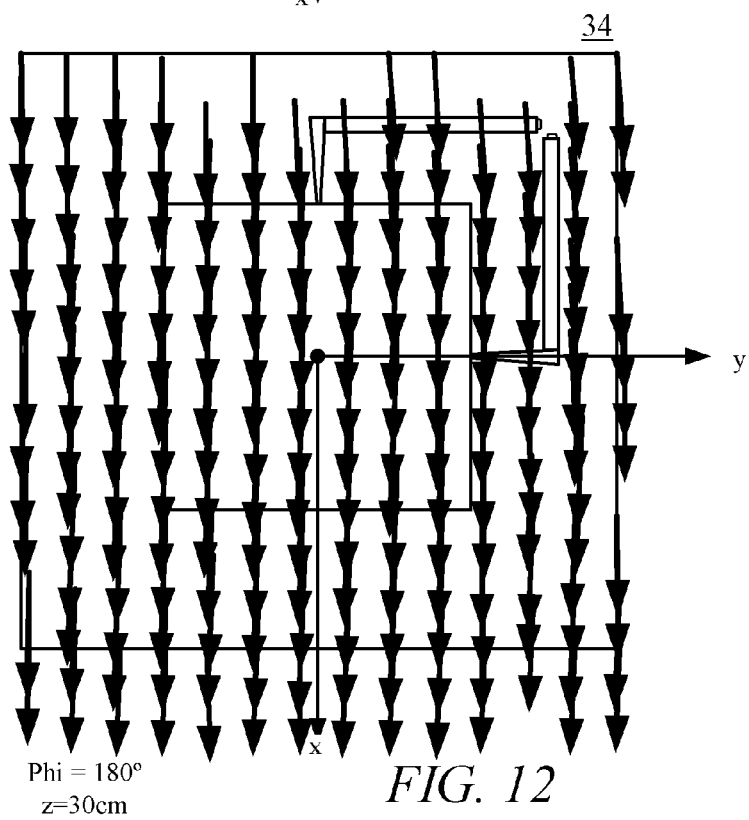
FIG. 12 is a vector diagram illustrating the 180° phase electric field pattern of a switchable patch antenna in the far field (30 cm above the metal patch) when the x-orientation source feed is energized in accordance with the principles of the present invention.

In FIG. 11, the vector field of the far field is shown in the 0° phase at a distance of 30 cm above the antenna plane 46. The field is an almost uniform field in the x-direction, having a high field strength. FIG. 12 shows the vector field of the far field in the 180° phase at a distance of 30 cm above the antenna plane 46. Again, the vector field is almost identical to the vector field created in the 0° phase at 30 cm except that the polarity has changed.

In all three field regions corresponding to FIGS. 7-12, the electric fields are primarily oriented in the x-direction, and in the two phases of the excitation wave only the polarity of the field changes. There are no null zones (regions on the plane where the field vanishes) in any case. By switching between the x-direction feed line 50a and the y-direction feed line 50b, all tags in proximity with the patch antenna 34 are discovered in time, regardless of orientation. This is especially useful in situations such as a shelf reader application where tags are stationary and may reside in these weak field regions during interrogation.

Figure 2:
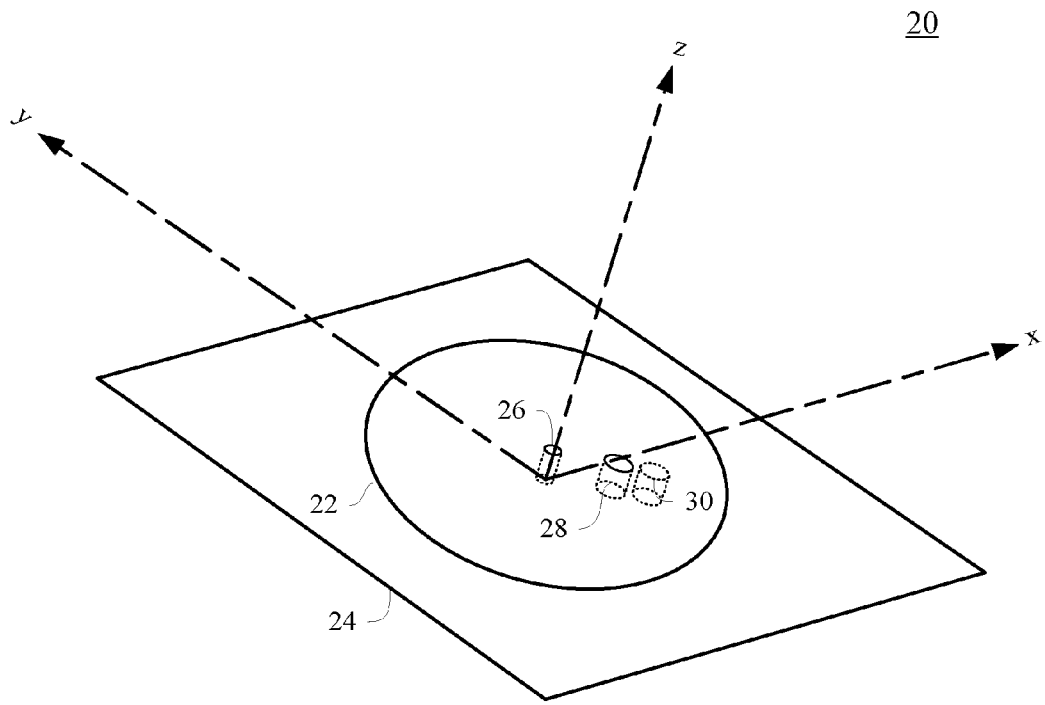
FIG. 2 is a perspective view of a prior art circularly polarized patch antenna.
Figure 3:
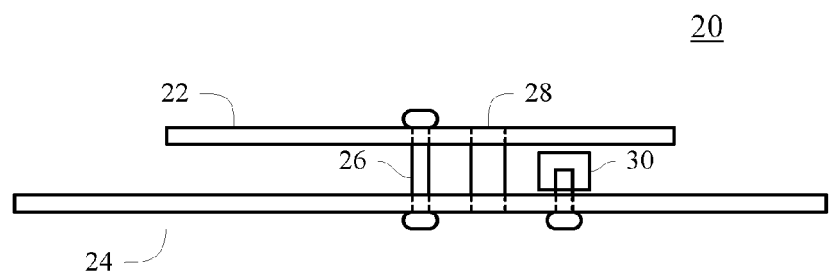
FIG. 3 is a side view of the prior art circularly polarized patch antenna of FIG. 2.
Figure 13:
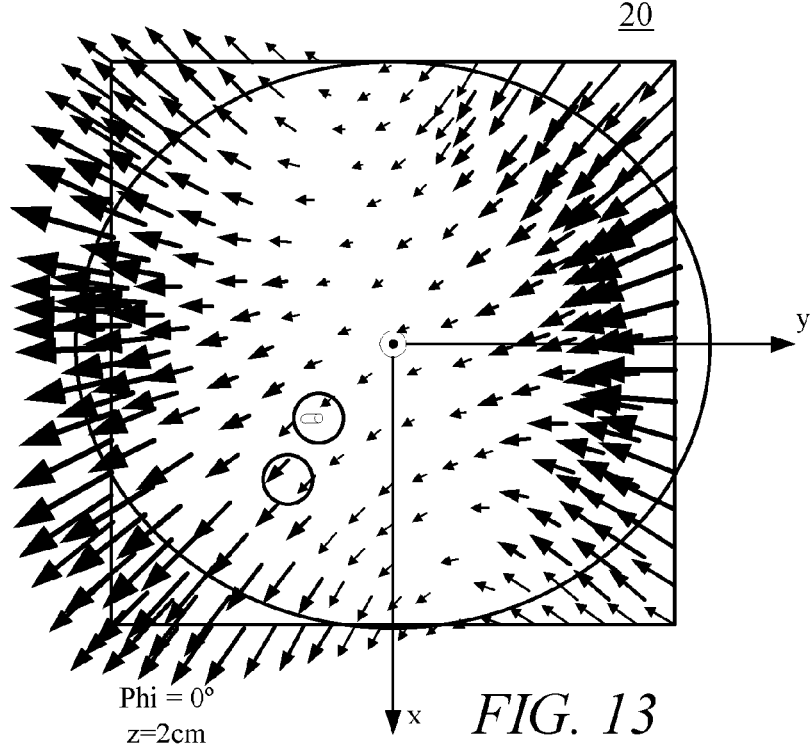
FIG. 13 is a vector diagram illustrating the 0° phase electric field pattern of a circularly polarized patch antenna in the near field (2 cm above the metal patch)
Figure 14:
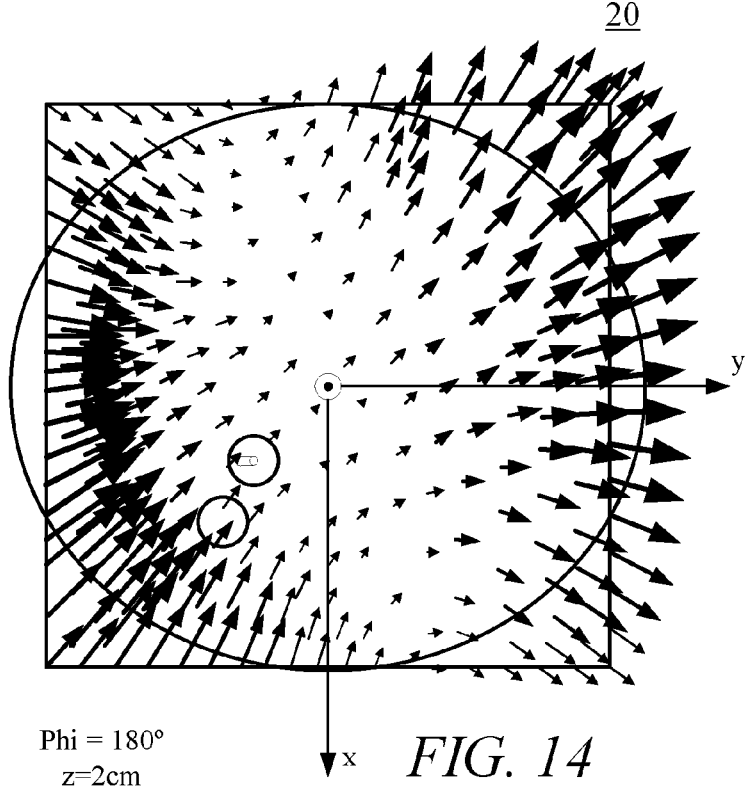
FIG. 14 is a vector diagram illustrating the 180° phase electric field pattern of a circularly polarized patch antenna in the near field (2 cm above the metal patch)

For comparison purposes, FIGS. 13-18 represent the three regions mentioned above, i.e., near field, radiating near field, and far field, for the two different phase modes for the circularly polarized antenna of FIG. 2, at heights of 2 cm, 5 cm and 30 cm, respectively. In FIG. 13, the vector field of the near field is shown in the 0° phase at a distance of 2 cm above the antenna plane 46. Note that the electric field strength is relatively weak along the x-axis in comparison to the field strength along the edges of the patch 22. FIG. 14 shows the vector field of the near field in the 180° phase at a distance of 2 cm above the antenna plane 46. Again, the field strength is weak along the x-axis.

Figure 15:
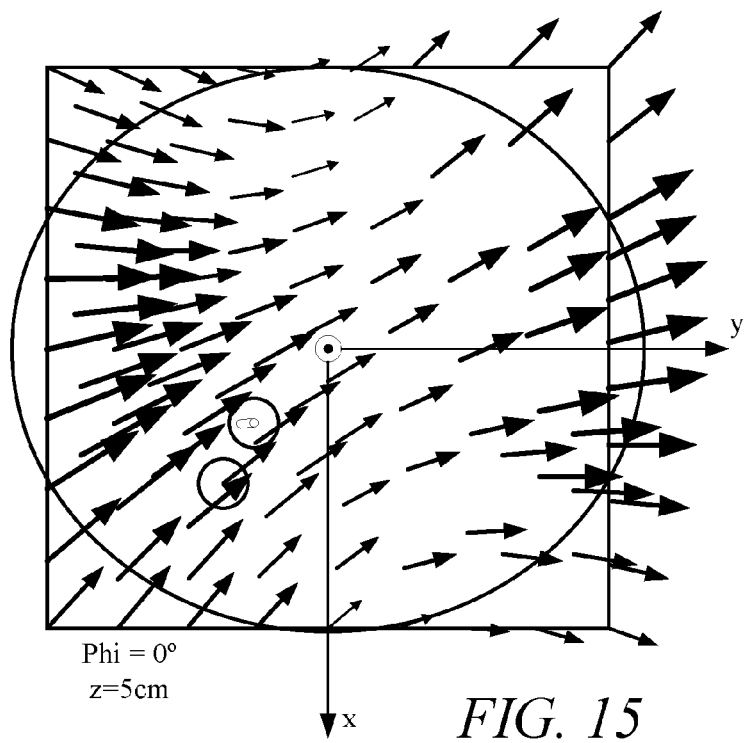
FIG. 15 is a vector diagram illustrating the 0° phase electric field pattern of a circularly polarized patch antenna in the radiating near field (5 cm above the metal patch)
Figure 16:
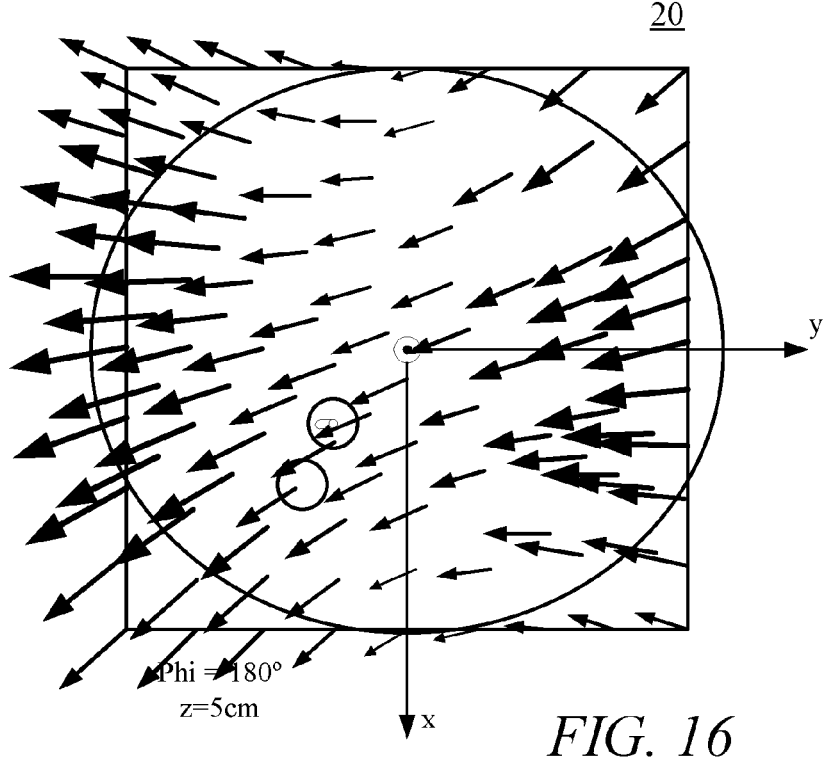
FIG. 16 is a vector diagram illustrating the 180° phase electric field pattern of a circularly polarized patch antenna in the radiating near field (5 cm above the metal patch)

In FIG. 15, the vector field of the radiating near field is shown in the 0° phase at a distance of 5 cm above the antenna plane 46. FIG. 16 shows the vector field of the radiating near field in the 180° phase at a distance of 5 cm above the antenna plane 46. While the field strength along the x-axis at 5 cm is greater than the field strength at 2 cm, it is still weak in comparison to the field strength along the edge of the patch 22. The magnitude of the arrows for FIGS. 17 and 18 which represent both polarization modes of the circular polarized antenna should preferably be substantially equal. For the particular example shown, the axial ratio, the ratio of the E field in the x and y orientations, is not unity.

Figure 17:
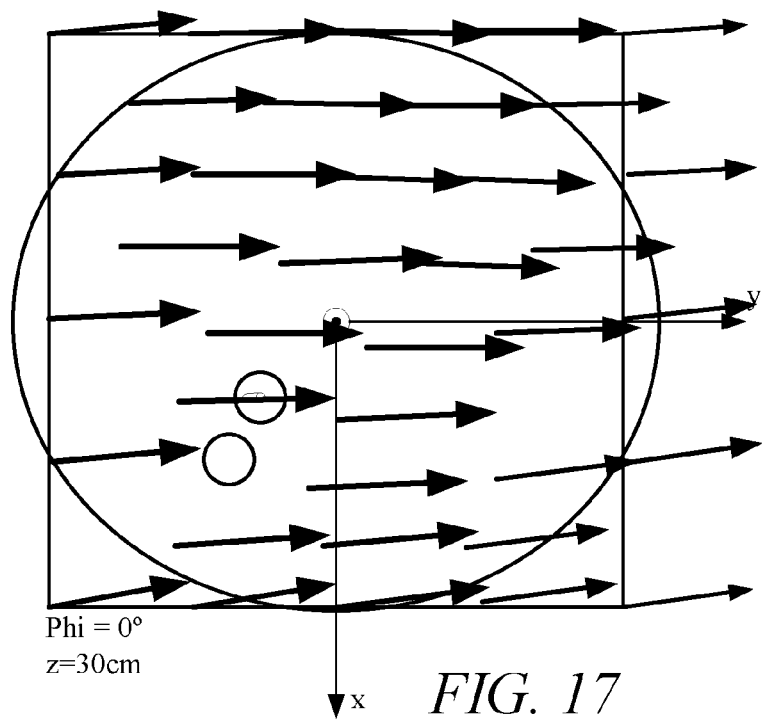
FIG. 17 is a vector diagram illustrating the 0° phase electric field pattern of a circularly polarized patch antenna in the far field (30 cm above the metal patch)
Figure 18:
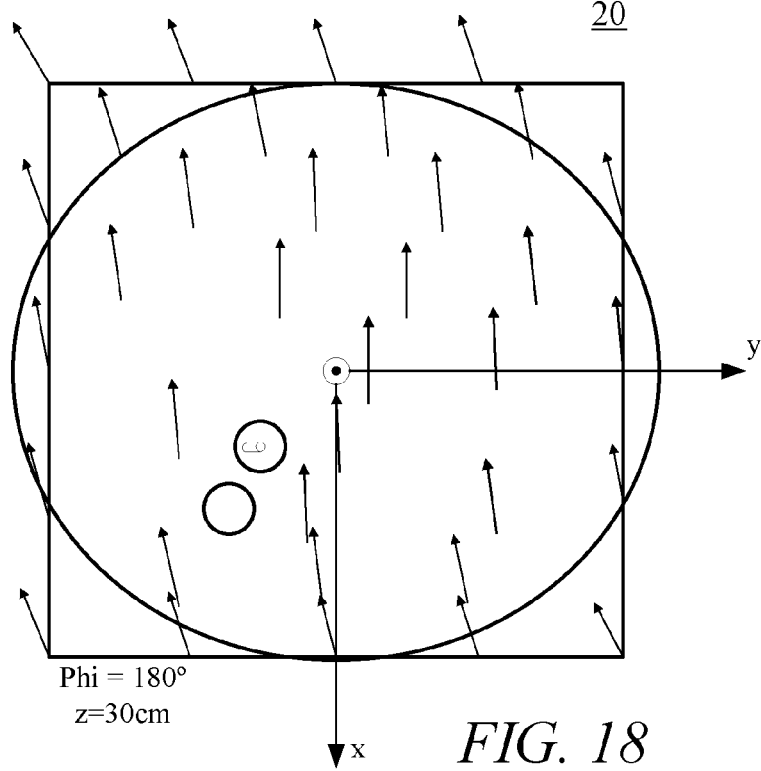
FIG. 18 is a vector diagram illustrating the 180° phase electric field pattern of a circularly polarized patch antenna in the far field (30 cm above the metal patch).

In FIG. 17, the vector field of the far field is shown in the 0° phase at a distance of 30 cm above the antenna plane 46. The field is an almost uniform field in the y-direction, having a high field strength. FIG. 18 shows the vector field of the far field in the 180° phase at a distance of 30 cm above the antenna plane 46. In this case, although the vector field is uniform in the orthogonal direction to the far field vector field created in the 0° phase it should be noted that the field strength has weakened significantly in comparison.

With a circularly polarized antenna, there are regions in the near field and radiating near field where in either of the two phase modes there is a near zero field orientation.

Embodiments of the present invention advantageously provide a switchable patch antenna displaying an electric field that is well behaved in the near field, the radiating near field, and the far field in all possible orientations above the antenna. By using the switchable patch antenna in an RFID shelf reader, the antenna can effectively communicate with all RFID labels located in the near field, radiating near field, and far field, regardless of orientation. Additionally, the switching patch antenna 34 discussed above may also be used in conjunction with the EAS deactivation system of U.S. patent application Ser. No. 12/331,604 to simultaneously deactivate a plurality of EAS tags.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A switchable patch antenna comprising:
a ground plane;
a metal patch positioned above, but not in contact with, the ground plane;
at least two feed lines, each feed line electrically connected to the metal patch, each feed line being substantially orthogonal to at least one other feed line; and
a switch electrically connected to the at least two feed lines, the switch operable to sequentially select between the at least two feed lines for exciting the switchable patch antenna.

2. The switchable patch antenna of claim 1, further comprising a dielectric substrate positioned between the ground plane and the metal patch.

3. The switchable patch antenna of claim 2, wherein the dielectric substrate is one of a printed circuit board and ceramic materials.

4. The switchable patch antenna of claim 1, wherein the at least two feed lines are microstrip transmission lines.

5. The switchable patch antenna of claim 4, wherein the microstrip transmission lines have substantially equal lengths.

6. The switchable patch antenna of claim 4, wherein the microstrip transmission lines are substantially symmetrical with respect to each other.

7. The switchable patch antenna of claim 4, wherein the microstrip transmission lines have equal impedance.

8. The switchable patch antenna of claim 1, wherein the metal patch has two pair of orthogonal edges, each orthogonal edge having a midpoint, each feed line is connected to the metal patch at the midpoint of an orthogonal edge.

9. The switchable patch antenna of claim 1, wherein a timing of the sequential selecting is based on a mode of operation of the switchable patch antenna, and wherein, in an interrogation mode, the patch antenna is selectively switched between two orthogonal directions for a first period of time and then the patch antenna is deactivated for a second period of time longer than the first period of time.

10. The switchable patch antenna of claim 1, wherein a timing of the sequential selecting is based on a mode of operation of the switchable patch antenna, and wherein, in a deactivation mode, the patch antenna is selectively switched between two substantially orthogonal directions for a first period of time and then the patch antenna is deactivated for a second period of time that is shorter than the first period of time.

11. The switchable patch antenna of claim 10, wherein the deactivation for the second period of time is in response to a triggering event.

12. A radio frequency identification ("RFID") shelf reader comprising:
   a controller;
   a transceiver electrically connected to the controller, the transceiver operable to transmit and receive RF signals; and
   a switchable patch antenna electrically connected to the transceiver, the switchable patch antenna including:
      a ground plane;
      a metal patch positioned adjacent, but not in contact with, the ground plane;
      at least two feed lines, each feed line electrically connected to the metal patch, each feed line being substantially orthogonal to at least one other feed line; and
      a switch electrically connected to the at least two feed lines, the switch operable to sequentially select between the at least two feed lines for exciting the switchable patch antenna.

13. The RFID shelf reader of claim 12, wherein the switchable patch antenna further includes a dielectric substrate positioned between the ground plane and the metal patch.

14. The RFID shelf reader of claim 12, wherein the at least two feed lines are microstrip transmission lines.

15. The RFID shelf reader of claim 14, wherein the microstrip transmission lines are substantially symmetrical with respect to each other and have substantially equal lengths.

16. The RFID shelf reader of claim 14, wherein the microstrip transmission lines have equal impedance.

17. The RFID shelf reader of claim 12, wherein the metal patch is substantially square.

18. The RFID shelf reader of claim 12, wherein a timing of the sequential selecting is based on a mode of operation of the switchable patch antenna, and wherein, in an interrogation mode, the patch antenna is selectively switched between two substantially orthogonal directions for a first period of time and then the patch antenna is deactivated for a second period of time that is longer than the first period of time.

19. A method for creating an electric field, the method comprising:
   providing a switchable patch antenna, the switchable patch antenna including:
      a ground plane;
      a metal patch positioned adjacent, but not in contact with, the ground plane;
      at least two feed lines, each feed line electrically connected to the metal patch, each feed line being substantially orthogonal to at least one other feed line; and
      a switch electrically connected to the at least two feed lines, the switch operable to select one of the at least two feed lines;
   sequentially selecting one of the at least two feed lines; and
   applying an excitation signal to the selected feed line.

20. The method of claim 19, wherein a timing of the sequential selecting is based on a mode of operation of the switchable patch antenna and wherein, in an interrogation mode, the patch antenna is selectively switched between two substantially orthogonal directions for a first period of time and then the patch antenna is deactivated for a second period of time that is longer than the first period of time.

* * * * *